Feb. 26, 1952   J. B. SEBOK ET AL   2,587,234
FILTER UNIT FOR AIR CLEANERS
Filed July 5, 1945   2 SHEETS—SHEET 1
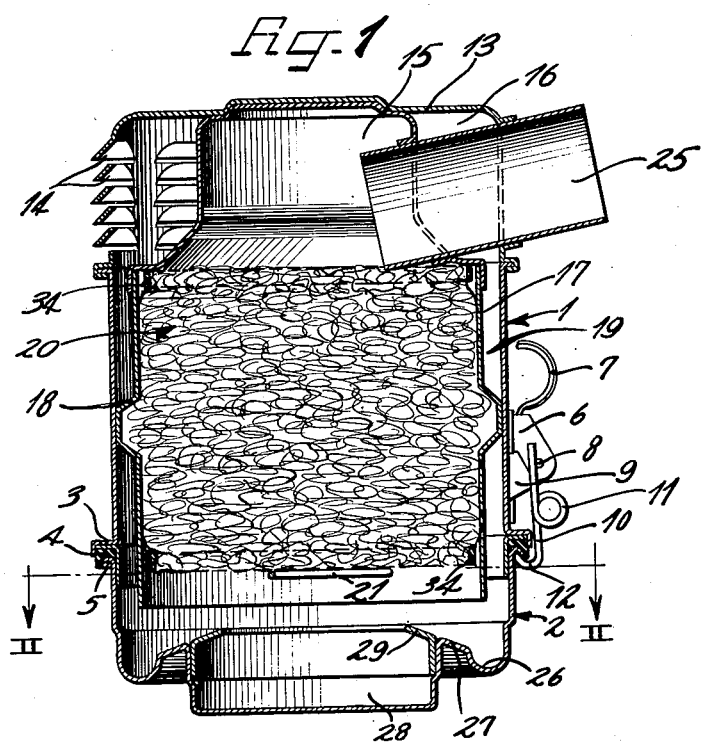
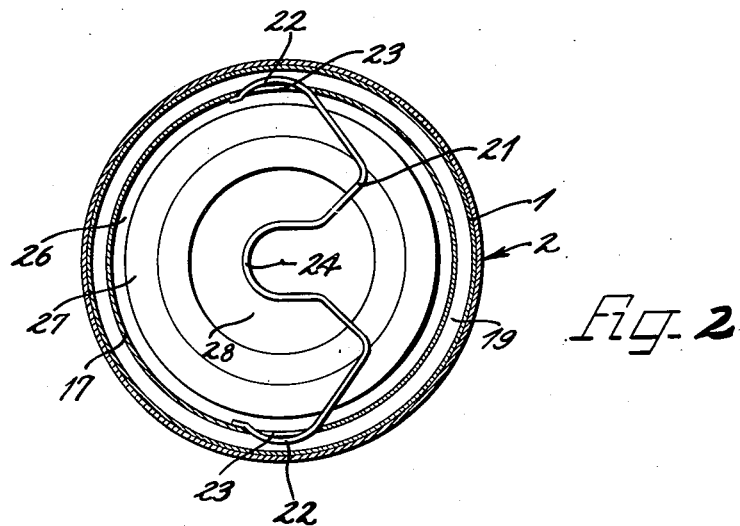
Inventors
Joseph B. Sebok
Wilham H. Browne
Arnold E. Parrish
by The firm of Charles W. Hills Attys.

Feb. 26, 1952  J. B. SEBOK ET AL  2,587,234
FILTER UNIT FOR AIR CLEANERS
Filed July 5, 1945  2 SHEETS—SHEET 2

Inventors
Joseph B. Sebok
William H. Browne
Arnold E. Parrish
Attys.

Patented Feb. 26, 1952

2,587,234

UNITED STATES PATENT OFFICE 2,587,234

FILTER UNIT FOR AIR CLEANERS

Joseph B. Sebok, Detroit, Mich., and William H. Browne and Arnold E. Pavlish, Columbus, Ohio, assignors to Houdaille-Hershey Corporation, Detroit, Mich., a corporation of Michigan Application July 5, 1945, Serial No. 603,304

3 Claims. (Cl. 183—44)

This invention relates to improvements in a filter unit for air cleaners, the filter unit being highly desirable for use in air cleaners associated with internal combustion engines, air compressors, brake mechanisms, and other equipment requiring a supply of clean air; and more particularly the invention is highly desirable for use in connection with automotive air cleaners of the type used with the internal combustion engine of a vehicle, although the invention may have other uses and purposes as will be apparent to one skilled in the art.

It is an important object of the instant invention to provide a durable and economical filter unit for liquid bath air cleaners, which unit has a low bulk weight, high cleansing efficiency, practically eliminates the danger of carry-over of liquid through the cleaner outlet, has a more than satisfactorily low restriction to the flow of air therethrough, and a relatively high capacity.

It is also an important feature of this invention to provide a filter element or unit comprising a mass of fibrous strands, which unit is so constructed that high uniform density may be easily reproduced from filter to filter in rapid and economical commercial manufacture, with only a negligible variance between resultant filter units.

Still a further object of the instant invention is the provision of a fiber filter unit capable of withstanding excessive vibration throughout a long life with no resultant adverse compacting or channeling of the filter unit.

Also an object of this invention is the production of a highly efficient filter unit for liquid bath air cleaners, said unit possessing all desirable properties, and comprising in the main a mass of curled vegetable fibers bonded together.

A filter unit made up of strands generally paralleling the flow of air through the unit provides a higher carry-over point for cleansing liquid by virtue of the unopposed surface attraction of the strands for liquid carried by traveling air. The self-cleaning action of the cleaner is also augmented by strands generally paralleling the air path due to the increased circulation of cleansing liquid through the lower portion of the filter unit. Limited advantages, which, in most cases, are more than offset by the disadvantages, occur in a filter unit having the strands substantially transverse to the air stream. In such case, droplets of fluid carried by traveling air are quicker broken up by virture of the direct right angle contact with a strand, and this is especially true in connection with the breaking up of air bubbles dispersed throughout the fluid medium, which bubbles may be carrying injurious dirt therein.

With these thoughts in mind, it is an important object of the instant invention to provide a filter unit for a liquid bath air cleaner so constructed as to embody the advantages of both a filter unit with strands paralleling the air stream and a filter unit with strands transverse to the air stream.

Also an object of the invention is the provision of a filter unit for liquid bath air cleaners, which unit is made up of a mass of vegetable fibers so arranged as to have some fiber portions paralleling the air stream, some fiber portions being disposed transverse to the air stream, and other fiber portions being disposed obliquely to the air stream.

Also an object of the instant invention is the provision of an economical and durable filter unit for a liquid bath air cleaner, which unit embodies all of the required properties of a filter unit and which may be so economically manufactured as to warrant the discarding of a dirty unit and the substitution of a new unit therefor. The filter unit embodied in the instant invention costs so little that it would be just as economical, if not more so, to replace a dirty unit with a new one, rather than go to the time and labor necessary to cleanse the dirty unit.

While some of the more salient features, characteristics and advantages of the instant invention have been above pointed out, others will become apparent from the following disclosures, taken in conjunction with the accompanying drawings, in which:

Figure 1 is a central vertical sectional view, with parts in elevation, of an air cleaner and filter unit embodying principles of the instant invention;

Figure 2 is a plan sectional view of the structure of Figure 1, taken substantially as indicated by the staggered section line II—II of Figure 1, looking in the direction of the arrows;

As shown on the drawings:

Figures 3, 4, 5:
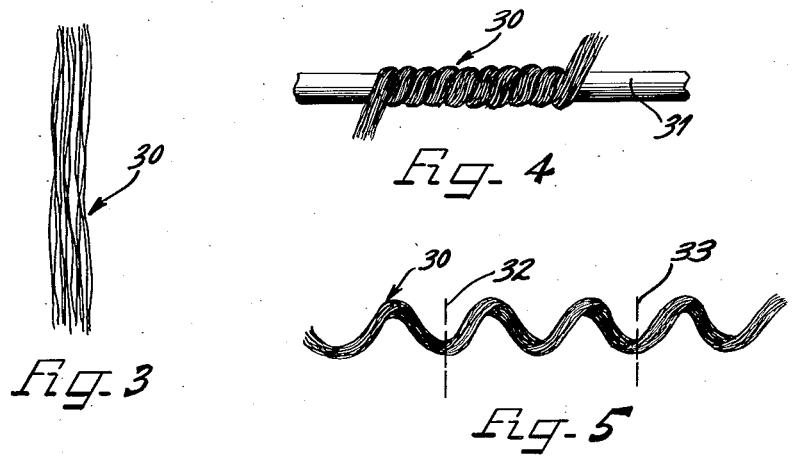
Figure 3 is a fragmentary and rather diagrammatic view illustrating a bunch of fibers going to make up the filter unit prior to the curling of the fibers.
Figure 4 is a fragmentary elevational view illustrating a step in the process of curling the fibers.
Figure 5 is a fragmentary view of a bunch of curled fibers indicating judicious points for cutting the fibers.

In that illustrated embodiment of the invention seen in Figures 1 to 5, inclusive, there is shown an air cleaner embodying a casing of separable sections, an upper casing section generally indicated by numeral 1 and a lower casing section in the form of a liquid cup generally indicated by numeral 2. Near the lower end thereof the upper casing section 1 has a fabricated gasket holding formation 3 in which an annular gasket 4 may be seated. The upper margin of the lower section 2 is outwardly rolled as indicated at 5 to seat against the gasket when the casing sections are telescopically joined. The sections may be held in operative assembled relationship by one or more spring clamping arrangements including a lever 6 having a thumb engaging portion 7, which lever is pivoted as indicated at 8 to a bracket 9 affixed to the casing wall. A U-shaped spring element 10, having a loop 11 in each leg thereof to increase its resiliency, is secured to the lever 6 above the pivot point 8. The lower end of the spring element or yoke of the U is turned upwardly as indicated at 12 to engage inside the groove defined by the rolled margin 5 on the lower casing section. The clamping arrangement is of the over-center type, and when the lever 6 is thrown upwardly to the position seen in Figure 1, the two casing sections are held together with the gasket 4 effecting an air-tight seal therebetween.

The upper casing section is provided with a closed top 13 and in the side wall thereof there is a plurality of louver-like inlet openings 14 for dirty air. Inside this casing section there is a housing or hood 15, preferably centrally disposed, and secured to the inside of the top 13. This housing or hood is of considerably less size than the casing section so as to leave an open space 16 therebetween to effect a better distribution of incoming air. The hood or housing flares outwardly in its lower portion and is joined to a filter holding shell 17 provided with pressed-out portions 18 which may be spot welded to the casing wall to increase the rigidity of the entire structure.

As clearly seen in Figure 1, the filter holding shell 17 is of less size than the adjacent casing wall so as to leave an annular passage 19 therebetween through which the incoming air descends from the chamber 16 at the top of the cleaner.

Within the shell 17 is a filter unit generally indicated by numeral 20 which may be removably held in position by means of a spring holder 21 seen better in Figure 2. This holding element 21 includes a pair of oppositely disposed legs having curvate end portions 22—22 which extend through suitable slots 23 in the wall of the shell 17. The central portion of the holding element is preferably U-shaped as indicated at 24 so that this central portion may be compressed between the thumb and finger of an operator to withdraw the curved portions 22—22 of the legs from the slots 23—23 and thus permit removal of the filter unit 20.

As will more fully appear later herein, air traveling through the cleaner passes upwardly through the filter unit 20 into the open space thereabove within the hood or housing 15. An outlet conduit 25 extends through both the casing wall and the wall of the housing 15 into the space above the filter unit, and the outer end of this conduit may be suitably attached to whatever mechanism is to be supplied with clean air, such for example as the carburetor intake of an internal combustion engine.

The lower casing section 2 mainly defines a sump for cleansing liquid such for example as crankcase oil. This section of the casing is shaped to define an outer annular trough-like portion 26 with an upwardly sloping bridge 27 connecting the trough-like portion with a deeper central well 28. A splash ring is attached in any suitable manner to the upper portion of the wall of the central well and this splash ring has an inwardly and upwardly inclined flange 29 which is in effect a continuation of the wall 27. The flange 29 prevents sump liquid from passing from the well 28 into the trough 26 by virtue of jarring or bouncing of a vehicle or the like carrying the air cleaner.

In operation, incoming air enters the inlet openings 14, distributes itself substantially equally throughout the space 16, and descends the annular passage 19 toward the liquid sump. This incoming air initially drives out the liquid from the trough 26 and carries it upwardly into the lower portion of the filter element 20. The depth of the trough 26 meters the amount of oil normally in circulation through the lower portion of the filter element during operation. As dirt laden liquid falls from the filter unit back into the sump, more liquid will be supplied to the trough 26 to be carried into the filter mass by the traveling air, so that the quantity in the lower portion of the filter mass during operation remains substantially constant. Preferably, the static level of sump liquid is adjacent the lower end of the filter shell, or it may be slightly thereabove.

The filter unit 20 is preferably composed of a mass of vegetable fibers bonded together, and sisal fiber is a very satisfactory material for this purpose. The filter unit and its construction may perhaps be best understood by way of a description of the method of making the unit.

At the outset, sisal fibers may be obtained in bales, or other types of packages, of a length in general from two to four feet. These raw sisal fibers frequently contain some portions of the leaves from which they were obtained, or other woody portions of the plant. It is therefore desirable to first card the raw fibers in any suitable carding mechanism so as to line up the fibers in substantially parallel relationship and remove the undesirable woody material. The carded fibers are then preferably fireproofed or flameproofed, especially when the resultant filter unit is to be used in an air cleaner for an internal combustion engine, where there may be backfire through the carburetor of the engine. The fireproofing may be accomplished either by immersion or by a spraying process, as may be deemed most expedient. A satisfactory fireproofing substance is a twenty percent solution of ammonium sulfamate in water, and if immersion is the process employed, a period of time between five and ten minutes is satisfactory. After the application of the fireproofing agent, the fibers are preferably passed between pressure rollers so adjusted as to remove a major portion of the moisture from the fibers.

Thereafter, while the fibers are still damp from the application of the fireproofing material, they are wrapped around a mandrel in the form of a single layer coil along the mandrel so as to impart a curl to the fibers. A mandrel of approximately one-eighth inch diameter may satisfactorily be used for this purpose. Then, while held in the curled position about the mandrel, the fibers are dried, at a temperature approximating 250° F. for a period approximating one hour. This drying operation not only dries out the moisture from the applied fireproofing material but the curl in the fibers is steamed into the fibers by virtue of the water being driven off.

Following this drying operation, the fibers may be cut into relatively short lengths, either while upon the mandrel or after removal from the mandrel. By way of example, the fibers may be cut into lengths of approximately one inch, which is a satisfactory length for most filter units, and each length will thereby contain several of the curls in the fiber.

With reference now to the drawings, especially Figures 3, 4 and 5, we have shown in Figure 3 a bunch of fibers generally indicated by numeral 30 as they are before the curling operation. In Figure 4 we have diagrammatically shown a mandrel 31 with the bunch of fibers 30 curled tightly around the mandrel. As stated above, this curling operation is preferably done while the fibers are still damp from the application of the fireproofing material. In Figure 5 we have illustrated the bunch of fibers removed from the mandrel after the drying operation, and the dotted lines 32 and 33 indicate where the fibers may be cut into the short lengths. The showings in these figures of the drawings are exaggerated in comparison with the sizes given above, for the purpose of clarity.

Following the cutting operation, the short lengths of fiber are preferably separated one from the other, by a carding operation or the equivalent, and they may be spread out upon a substantially flat surface. A bonding medium is then sprayed or equivalently applied to the fiber lengths. Preferably, a plastic bonding medium is utilized, and this bonding medium may be either a thermoplastic or a thermo-setting plastic as may be deemed most desirable. By way of example, a thermoplastic resinous material comprising a copolymer of vinyl chloride and vinylidene chloride may be dissolved in cyclohexanone to the extent of seven parts per hundred of solution and then applied in a fine spray upon the carded or separated fiber lengths. Such material has a relatively high melting point, that is, a melting point above the temperature which can be satisfactorily employed in connection with sisal fiber. It is therefore necessary to pack the plasticized curled fiber lengths in a mold before the applied plastic becomes dry. After the fibers are placed in a mold so that the resultant mass will have the desired shape of the filter element being manufactured, they are then subjected to a heat treatment to drive off the solvent from the plastic resinous material, which heat treatment may vary from a period of time of half an hour to two hours at a temperature between 200 to 300° F., depending upon the particular plastic bonding medium utilized.

There are several different ways in which the plastic treated and still wet fiber lengths may be shaped into the desired filter unit contour and thickness. One of these ways may consist in merely packing the fibers in a glass or metal mold of a size slightly in excess of that of the filter holding shell in the particular air cleaner for which the filter unit is to be made. The fibers are now packed into a compact mass akin to a piece of felt, but with just sufficient pressure to cause a bonding of one fiber to an adjacent fiber at spaced points therealong (the curls in each fiber length being out of phase with those of an adjacent length) and provide a filter mass of uniform density and possessing an inherent resiliency. The resiliency, as well as a stiffening of the fibers, is provided by the plastic bonding medium. A filter unit so made needs no external wrapping or covering for it to ultimately maintain its shape. However, in order to facilitate the placing of the filter unit in the filter shell of an air cleaner, it is preferable to bind the unit or otherwise constrict it adjacent its ends, so that the end portions of the unit will be of less cross-sectional area than the intermediate portion. One way of accomplishing this binding, may be by way of a cord or tape tied around the end portions of the unit in a manner to constrict them somewhat, as indicated at 34—34 in Figure 1. The resultant unit will therefore have what may be considered somewhat of a barrel shape, and with the reduced end portion, it making no difference which end, the unit may be easily slipped into the filter holding shell 17. By virtue of the fact that the unit was made in a mold slightly oversize, the body portion of the unit, due to its inherent resiliency, will press against the sides of the shell 17 so that the unit is in effect self-sealing, and it will be appreciated that no gasket means whatever need be associated with the unit to prevent by-passing of air around the unit.

In the event it is ultimately desired to have the filter mass encased in a covering, for example, to replace units in air cleaner casings designed for that type of filter element, it is a simple expedient to pack the plasticized and still damp fiber lengths in the particular casing or shell they are to remain in during ultimate use. Such a shell is indicated at 35 in Figure 6 of the drawings, and it may be of sheet metal, or for added economy, of paper board or the equivalent preferably adequately fireproofed.

Still another way of shaping the ultimate filter unit would consist in separating or plucking the curled fiber lengths and letting them accumulate in the form of a mat which may be sprayed at various steps with the plastic bonding medium. After the mat has reached a certain height or thickness, the particular filter unit may be cut from the mat by means of a device akin to the commonly known cookie cutter, suitable pressure being applied either before or during the cutting operation to compress the mat to the desired extent.

Still another way of accomplishing this purpose embodies a substitute for the plucking or carding operation of the curled fiber lengths. The relatively short helical bundles of cut or curled fibers may be placed in the path of an air blast, which will blast the cut sections into a large chamber and permit the free fibers to settle to the bottom of the chamber. As these fibers are settling to the bottom of the chamber, they may be sprayed with the plastic bonding medium and a uniform bat or mat will accumulate at the bottom of the chamber, and a cutter akin to a cookie cutter may be utilized to provide the individual filter units. To avoid any waste, the collection chamber may be a mold of the size, or approximately of the size, of the ultimate filter unit and cutting eliminated.

It will of course be understood that other substances may be utilized for fireproofing, and other bonding media may also be utilized, the above examples of these particular substances, as well as the above examples of sizes and temperature ranges are given by way of example only and not by way of limitation. Many variations in the above processes will become apparent to those skilled in the art and be well within the purview of this invention.

Figure 6:
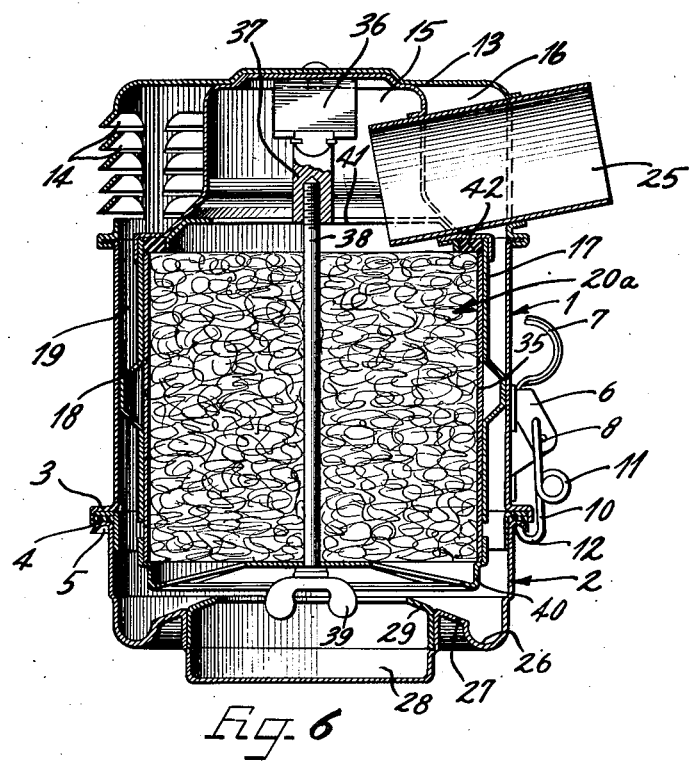
Figure 6 is a view similar in character to Figure 1, but showing a somewhat different construction of the air cleaner and filter unit.

In Figure 6, we have illustrated a cleaner adapted for the reception of a filter unit, generally indicated by numeral 20a, having a covering 35 therearound. In most respects, the cleaner of Figure 6 is of the same construction as that above described in connection with Figures 1 and 2. The difference resides mainly in the manner of holding the filter unit 20a in the shell 17. In the instance of Figure 6, a supporting bracket 36 secured to the top of the casing carries a female stud 37 into which a centrally disposed bolt 38 may be threadedly engaged. This bolt extends entirely through the filter element and has a wing formation 39 on the lower end for manual manipulation. Between the wing 39 and the shell 17 is a spider arrangement 40 which telescopes over the lower margin of the shell and retains the filter element 20a in position.

The cleaner construction is preferably provided with a gasket holding flange 41 which supports a gasket 42 against which the upper edge of the cover 35 of the filter unit abuts.

As stated above, the cover 35 of the filter unit 20a may be of paper board, metal, or any other desirable or suitable substance, and this cover takes the place of the external binding elements 34—34 described in connection with Figure 1. It is not, in fact, by virtue of the plastic bonding of the fibers, essential to provide a covering around the fiber mass, such cover merely functioning as an external binding of the mass, to facilitate its removal and replacement in the filter holding shell 17. The operation of the structure shown in Figure 6 is substantially the same as above described in connection with the structure of Figure 1.

Curled sisal fiber filter elements made in accordance with the instant invention result in several advantages over previously known air cleaners. For example, tests have proven that a filter element of the character set forth herein results in increased cleansing efficiency, maintains a low restriction during use, and has a low bulk weight. As a specific example, a curled sisal fiber filter element made up of fibers approximately one inch in length having a one-sixteenth inch curl and a weight of 0.26 gram per cubic inch showed a dust removal efficiency of 98.7% and a pressure increase of only 0.85 inch of water during the test. In comparison, a commercially used air filter employed by the Armed Forces, when tested under identical conditions, showed a dust removal efficiency of 96.4% and a pressure gain across the filter of 2.40 inches of water.

Similar tests have established that a curled sistal fiber filter increases the capacity of the cleaner, in that more cubic feet of air per minute may be passed through the cleaner without danger of the cleansing liquid being carried over into the carburetor with which the cleaner is associated. In addition, the effective weight, that is, the portion of the filter figured on a weight basis which actively participates in removing dust from air traveling therethrough, has proved to be generally higher than that obtained by other filter arrangements.

An outstanding feature of the curled fiber filter element is its uniformity and the ease with which that uniformity may be reproduced from filter to filter during commercial manufacture. Under commercial operating conditions, the dust removal efficiency of the curled fiber filter unit should be controllable without any excess effort in that regard within less than one-half of one percent. The factor to which this reproducible uniformity characteristic is attributed is that a curled fiber filter element has fibers running parallel to the flow of air, transverse thereto and obliquely thereto. The relative proportion of each curled fiber which will be disposed parallel to the air flow as compared with that portion of the fiber which will be disposed in a direction transverse to the air flow will be altered very little regardless of the position of the curled fibers in the filter mass. Because of the uniformly curled shape of the fibers, there is no possibility of the fibers lying on their sides or compacting. Likewise, there is substantially no possibility of the completed filter mass becoming channeled. The inherent resiliency of the filter unit tends to resist such channeling in addition to other factors.

It will, of course, be understood that various details of the process and construction may be varied through a wide range without departing from the principles of this invention and it is, therefore, not the purpose to limit the patent granted hereon otherwise than necessitated by the scope of the appended claims.

We claim as our invention:

1. A filter unit for liquid bath automotive air cleaners, said unit being made up of a mass of vegetable fibers initially loosely bunched and curled in strands, said curled strands being cut in relatively short lengths and being bonded together at random by a dry setting plastic substance, said filter unit being of uniform density and inherent resiliency.

2. A filter unit for an air cleaner, including a mass of sisal fibers initially loosely bunched and curled in strands, said curled strands being cut in lengths not exceeding two inches and having a plurality of curls to each length, said lengths being bonded together at random by a dry setting plastic substance to provide a homogeneous filter mass of uniform density.

3. A dry filter unit, including a mass of vegetable fibers initially loosely bunched in strands, said strands being treated with a flame-proofing agent and subsequently curled and set by the action of said agent, said strands being further cut into short lengths with a plurality of curls to each length, said lengths being bonded together at random by a dry setting plastic material, thereby imparting resiliency and uniform density to said filter unit.

JOSEPH B. SEBOK.
WILLIAM H. BROWNE.
ARNOLD E. PAVLISH.

REFERENCES CITED

The following references are of record in the file of this patent:

UNITED STATES PATENTS

| Number | Name | Date |
|---|---|---|
| 1,375,498 | Farmer | Apr. 19, 1921 |
| 1,829,401 | Kamrath | Oct. 27, 1931 |
| 1,829,618 | Studer | Oct. 27, 1931 |
| 2,019,241 | Weiss | Oct. 29, 1935 |
| 2,062,090 | Gaarder et al. | Nov. 24, 1936 |
| 2,112,799 | Williams | Mar. 29, 1938 |
| 2,152,901 | Simison | Apr. 4, 1939 |
| 2,167,323 | Hegan | July 25, 1939 |
| 2,178,614 | Slayter | Nov. 7, 1939 |
| 2,189,840 | Manning | Feb. 13, 1940 |
| 2,196,469 | Moeller | Apr. 19, 1940 |
| 2,416,851 | Sebok | Mar. 4, 1947 |
| 2,492,083 | Zelinski | Dec. 20, 1949 |

FOREIGN PATENTS

| Number | Country | Date |
|---|---|---|
| 541,441 | Great Britain | Nov. 26, 1941 |
| 112,138 | Australia | Dec. 11, 1940 |
| 492,235 | France | Mar. 11, 1919 |
| 766,983 | France | July 7, 1934 |